Patented Mar. 17, 1942

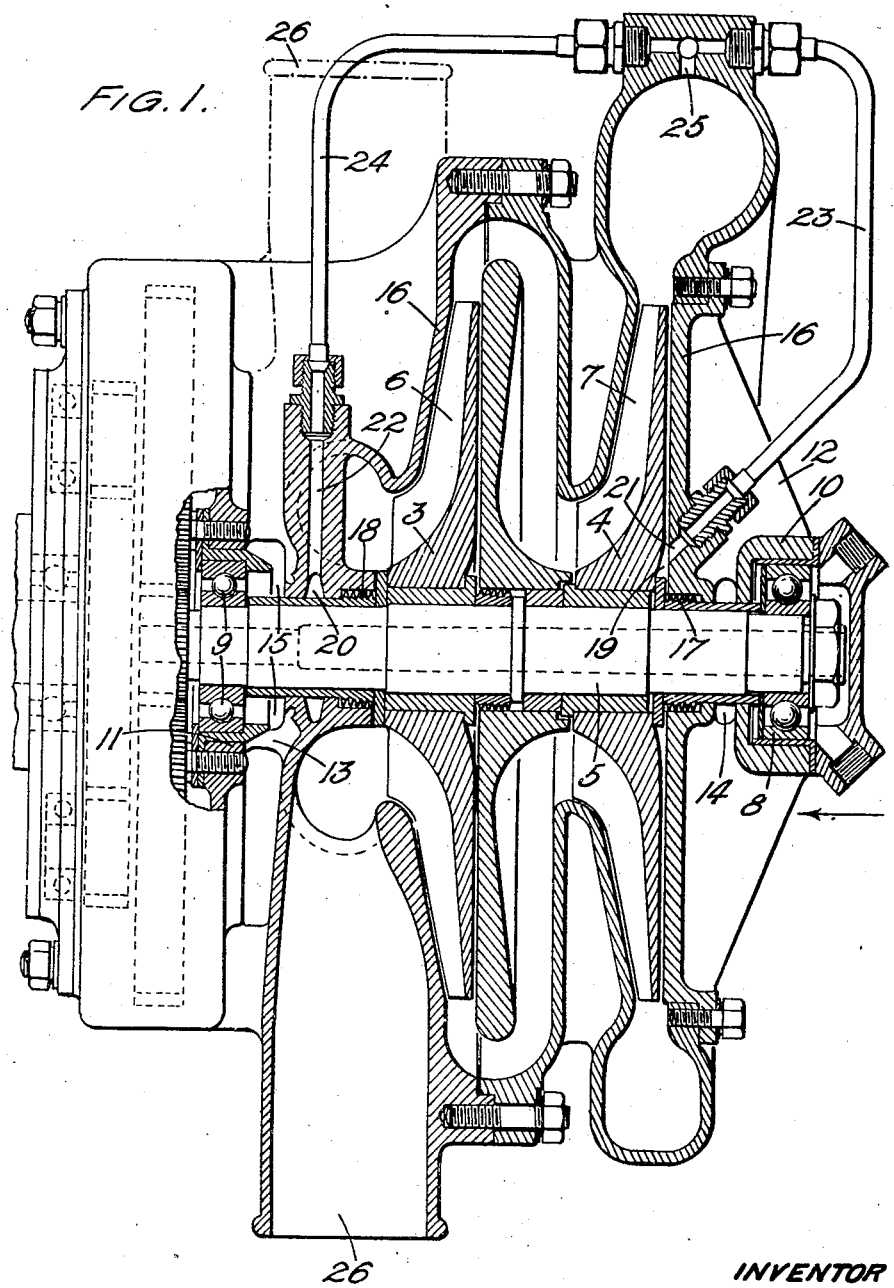

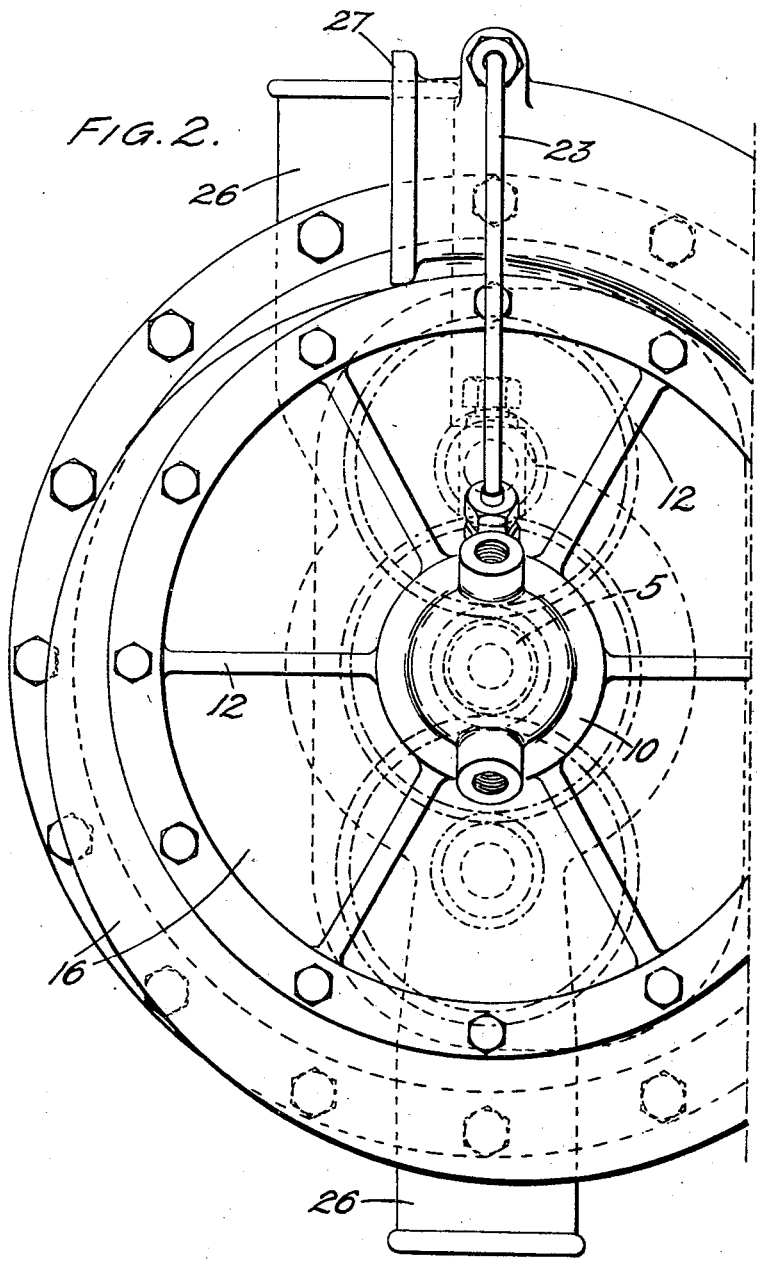

2,276,965

UNITED STATES PATENT OFFICE 2,276,965

COMPRESSOR

George Frederic Halliday, Kingswood, Bristol, England, assignor to Aero Engines Limited, Kingswood, Bristol, England Application February 10, 1940, Serial No. 318,347
In Great Britain February 11, 1939

2 Claims. (Cl. 230—132)

This invention relates to compressors and its primary object is to improve upon the compressors which may be required to deliver air or other gas free from such lubricating oil as might ordinarily be expected to contaminate the delivery. The invention is primarily intended to be applied to compressors for the supply of air for pressure cabins of aircraft or other chambers for human occupation. The invention is particularly concerned with compressors of such construction that the elements performing the actual compression do not require lubrication, e. g. turbo-compressors of axial or radial flow type. Such machinery is usually adapted to run at high rotational speed and, in principle, to have rotor compressor means carried by bearings which require lubrication.

According to the present invention, compressor machinery of the kind set forth having a bearing or other device requiring lubrication such as might cause contamination of the working fluid, is isolated by an air space between the housing of the bearing or other device and the compressor means, the air space being in communication with atmosphere. Preferably the compressor means have a space or a plurality of spaces intervening between them into which air or other gas, preferably the same as that which is being compressed, is introduced under pressure of a sufficient degree to cause outward flow of said gas into the free air space referred to above and thereby to prevent the ingress of lubricating oil from the bearing to the interior of the space in which compression takes place. Thus, for example in a centrifugal compressor the rotor is mounted on a shaft for rotation in a casing and the shaft is borne in bearings on each side of the casing, spaces open to atmosphere being provided between the bearings and the casing enclosing the impellers. Preferably there are also annular spaces surrounding the shaft immediately inside the impeller casing into which air is fed from the diffuser or delivery side of the compressor, preferably in the region of highest pressure, so that when in operation ingress of lubricating oil along the shaft is prevented. The rotor shaft or bearings preferably include a labyrinth packing or the like, or a plurality of such packings. In one form of the invention a free air space and pressure space may be provided between a shaft bearing and a labyrinth which is axially spaced therefrom on the shaft and the air is introduced into that pressure space so that some of it returns through the labyrinth into the compressor and some of it escapes into the free air space. In another form where a compressor rotor has comparatively small clearance on one side of it, from the wall of the casing, a space is provided near the shaft and surrounding the same either by making the face of the rotor slightly concave or by similarly forming the casing wall and into that space the compressed air is fed, for example by a passage through the wall.

In order that it may be clearly understood and readily carried into effect, the invention is hereinafter described with reference to the accompanying diagrammatic drawings, in which:

Figure 1 illustrates a two-stage centrifugal compressor according to the invention; while Figure 2 is an end elevation corresponding to Figure 1 looking in the direction of the arrow of Figure 1.

As shown in the drawings, a two-stage centrifugal compressor has its rotors 3 and 4 mounted upon a common shaft 5, the rotors being of the unilateral intake type and therefore having one side provided with vanes as indicated at 6 and 7 respectively, while the reverse side of each rotor is relatively flat. The shaft is borne in ball bearings 8 and 9 each carried in an annular housing indicated respectively at 10 and 11, by spaced ribs 12 and 13 respectively, defining air spaces 14 and 15 isolating the bearings from the rotors 3 and 4. The ribs 12 and 13 may preferably be cast integrally with the casing 16. Between the end bearings of the shaft 5 and the rotors, there are also provided in a preferred form of the invention labyrinth or equivalent packings as indicated for example at 17 and 18. In addition to the spaces 14 and 15 isolating the rotor assembly from the bearings 8 and 9 and between the rotor assembly and the said spaces, there are provided pressure spaces 19 and 20. In the arrangement illustrated in Figure 1, the pressure spaces 19 and 20 are somewhat differently arranged, but in function are the same, being supplied with air under pressure from a high pressure point of the blower. For communication with the high pressure source the casing immediately surrounding each of the bearings 8 and 9 is ported as indicated at 21 and 22 respectively, the ports 21 and 22 being coupled up to a convenient high pressure output point of the blower through the pipelines 23 and 24. The high pressure supply source as shown, is conveniently tapped off from the bifurcated port 25 conveniently provided at a point where the delivery pressure is just about at its highest. The arrangement ensures that when the compressor is working, a pocket of comparatively compressed air is established in the pressure spaces 19 and 20, and consequently it is ensured that if there is any leakage of oil from the ball bearings, it will essentially be directed away from the impellers.

It will be observed from Figure 1 of the drawings, that the arrangement and disposition of the pressure spaces shown varies considerably. For instance, the space 19 is in fact mainly provided by dishing out an inner portion of the rotor 4, and the labyrinth packing 17 is provided between the pressure space 19 and space 14 isolating the ball bearing 8 from the compressor means. Therefore in the case of the bearing at the right-hand end of Figure 1, any air passing out from the pressure space 19 must work its way through the labyrinth packing 17. By comparison, it will be seen that the other pressure space 20 is actually formed in the part of the casing immediately surrounding the shaft 5, the labyrinth packing 20 in this case being located between the rotor 3 and the isolating space 15 of the other end ball bearing indicated in dotted lines at 9. It will be appreciated that in both cases the rotor chambers are kept completely free from oil-contaminated vapour, with the result that air taken in through the inlets 26 is discharged at the outlet 27 (see Figure 2) at high pressure, but otherwise in exactly the condition in which it entered the blower.

As the present invention is not concerned with details of the blower, it is not thought necessary to deal with the blower construction either of the specific type shown or, for that matter, of other types to which the invention might be applied. The general construction of two-stage centrifugal blower shown in the drawings will, however, be readily apparent to those skilled in the art. It is to be understood, however, that the different arrangements of pressure spaces shown may be regarded as alternatives, in that it may be desirable in some cases to have the pressure spaces at each end of the rotor assembly of similar form, in which case either of the alternative forms may be employed.

What I claim is:

1. A compressor comprising a body having a chamber provided with an inlet and an outlet, bearing means carried by said body, a shaft mounted in said bearing means, a rotor mounted on said shaft within said chamber, said body having a portion around said shaft between the chamber and the bearing, said body having a space therein between the chamber and such means, means connecting such space to the outlet, said space being otherwise closed to the atmosphere, said compressor having a space around said shaft between such portion and the bearing communicating with the atmosphere.

2. A compressor comprising a body having a chamber provided with an inlet and an outlet, bearing means carried by said body, a shaft mounted in said bearing means, a rotor mounted on said shaft within said chamber, a packing carried by said body around said shaft between the chamber and the bearing, said body having a space therein between the chamber and packing means, means connecting such space to the outlet, said space being otherwise closed to the atmosphere, said compressor having a space around said shaft between the packing and the bearing communicating with the atmosphere.

GEORGE FREDERIC HALLIDAY.